UNITED STATES PATENT OFFICE.

JAMES H. CONNOR, OF SHARPSBURG, PENNSYLVANIA.

PROCESS OF MANUFACTURING FERTILIZERS.

1,163,130. Specification of Letters Patent. Patented Dec. 7, 1915.

No Drawing. Application filed October 9, 1913. Serial No. 794,335.

*To all whom it may concern:*

Be it known that I, JAMES H. CONNOR, a resident of Sharpsburg, in the county of Allegheny and State of Pennsylvania, have invented a new and useful Improvement in Processes of Manufacturing Fertilizers, of which the following is a specification.

This invention relates to the manufacture of artificial fertilizers from blast furnace slag, and particularly such blast furnace slags as contain no phosphatic ingredients.

The purpose of the invention is to provide a process of manufacturing from blast furnace slag an odorless fertilizer having a very considerable percentage of calcium and phosphorous compounds which are water soluble, and a further percentage of those compounds which are citrate soluble.

There are available in all countries large quantities of blast furnace slag which contain no phosphatic material, and which is available for the manufacture of an odorless fertilizer by my improved process. Such slag usually contains from thirty to forty per cent. of lime constituent, mostly in the form of a silicate, but a portion existing as calcium oxid, eighteen to twenty per cent. of iron, about nine per cent. of a calcium-magnesium compound, probably in the form of a silicate, and from seven to fourteen per cent. of magnesium salts.

In carrying out my process I make use of such slag in any form that it comes from the blast furnace, whether granulated or in solid form. If in solid form it must be crushed to substantially the size of granulated slag, but the granulated slag is sufficiently fine for the purpose without previous treatment.

In carrying out the process I add to the slag some form of phosphatic material, either phosphate rock, phosphate earth, bone phosphate, or any alkali earth containing phosphate, in order to supply the necessary amount of this ingredient to the fertilizer. Preferably, also, there will be added to the mixture some form of calcium compound and some form of sodium compound.

The calcium compound may be of any form, either ordinary burnt lime, quicklime, or limestone. If quicklime is used it is already sufficiently fine, while if ordinary lime is used it is first slaked, and if limestone is used it is first crushed or ground. These calcium compounds or substances are all equivalents and are to be understood as embraced by the general term "lime", as hereinafter employed in the claims.

The sodium compound is preferably soda ash on account of its cheapness and the energy of its reaction, but if desired ordinary salt or sodium chlorid may be substituted therefor; or if preferred both sodium chlorid and sodium carbonate may be employed. All these equivalent substances are to be understood as included within the general term "soda ash" as used in the claims hereto appended.

In case it is desired that the fertilizer also contain a potassium compound this is provided by adding to the mixture an amount of crushed or ground feldspar rock sufficient to give the desired percentage of potassium compound.

The various ingredients are mixed together in the proper proportions by means of any suitable mixing apparatus or by hand, and preferably in a dry state, but if moist it does not affect the process. The mixture is then fed into a rotary kiln or other suitable calcining furnace and heated from 1800 to 3000 degrees Fahrenheit for about an hour's time. The material comes from the furnace in granular form, about the size of buckwheat, is perfectly dry, is perfectly odorless, and needs no further treatment except to reduce it to pulverulent form, when it is ready for sacking. It contains a very considerable percentage of lime or calcium compound and a certain percentage of phosphorous compound, such as mono-calcium phosphate (depending upon the amount of phosphatic material added), which are water soluble, and other portions of calcium compound and phosphorous compound, such as the superphosphate, $Ca_2H_2P_2O_8$, which are citrate soluble.

The proportions of material may vary within very considerable limits, depending upon the percentage of available phosphoric acid and lime which is desired. A mixture of about 1400 or 1500 pounds of granular or crushed slag with from 50 to 400 pounds of the lime constituents, 50 to 400 pounds of ground phosphate rock or its equivalent, and from 50 to 400 pounds of soda ash or other sodium compound, will produce from 18 to 20 per cent. of calcium compound which is water soluble and from 4 per cent. upward of water soluble phosphorous compound. The large percentage of water soluble calcium compound is a striking result of the process and is very important. The balance of the calcium compound is nearly all citrate soluble. The water soluble calcium compound is reinforced by the very considerable percentage of water soluble phosphorous compound, and the combination when used as a fertilizer acts to draw nitrogen and ammonia from the air and bring it to the plant. It is entirely odorless and is a soil corrector.

The amount of lime constituent to be added depends upon the amount of available calcium content which the final fertilizer is to contain, and also upon the analysis of the particular slag used. The amount of phosphate rock will vary according to the particular analysis of the phosphate rock itself, and also according to the phosphorous compound content which the fertilizer is to have. The amount of soda ash or salt will vary according to the amount of water soluble calcium and phosphorous compounds which it is desired to produce, while the amount of feldspar will be varied according to the desired potassium content of the fertilizer.

The magnesium salts in the slag are by the reaction replaced by compounds containing soluble potassium salts.

According to this process I may employ any one of the following mixtures: Slag, lime, and phosphate rock. Slag, lime, phosphate rock, and soda. Slag, lime, phosphate rock, soda, and feldspar. Slag, phosphate rock, and soda. Slag, phosphate rock, soda, and feldspar.

What I claim is:

1. The process of manufacturing artificial fertilizer, consisting in mixing blast furnace slag, phosphatic material and soda ash, all in a fine condition, and then calcining the same and thereby rendering a portion of the phosphoric acid water soluble.

2. The process of manufacturing artificial fertilizer, consisting in mixing blast furnace slag, phosphatic material, soda ash, and lime, all in a fine condition, and then calcining the same and thereby rendering a portion of the phosphoric acid water soluble.

3. The process of manufacturing artificial fertilizer, consisting in mixing blast furnace slag containing calcium and magnesium salts, phosphatic material and soda ash, all in a fine condition, and then calcining the same and thereby rendering a portion of the calcium, magnesium and phosphoric acid water soluble.

4. The process of manufacturing artificial fertilizer, consisting in mixing blast furnace slag containing calcium and magnesium salts, phosphatic material, soda ash, and lime, all in a fine condition, and then calcining the same and thereby rendering a portion of the calcium, magnesium and phosphoric acid water soluble.

5. The process of manufacturing artificial fertilizer, consisting in mixing blast furnace slag containing a calcium compound, phosphatic material, soda ash, and feldspar, all in a fine condition, and then calcining the same and thereby rendering a portion of the calcium, potassium and phosphoric acid water soluble.

6. The process of manufacturing artificial fertilizer, consisting in mixing blast furnace slag, phosphatic material, soda ash, lime, and feldspar, all in a fine condition, and then calcining the same and thereby rendering a portion of the lime, potassium and phosphoric acid water soluble.

7. The process of manufacturing artificial fertilizer, consisting in mixing blast furnace slag, phosphatic material, lime, and feldspar, all in a fine condition, and then calcining the same and thereby rendering a portion of the lime, potassium, and phosphoric acid water soluble.

8. The process of manufacturing artificial fertilizer, consisting in mixing blast furnace slag containing a calcium compound, phosphatic material and soda ash, all in a fine condition, and then calcining the same to a temperature short of fusion and thereby rendering a portion of the calcium and phosphoric acid water soluble.

9. The process of manufacturing artificial fertilizer, consisting in mixing blast furnace slag containing a calcium compound, phosphatic material, soda ash, and feldspar, all in a fine condition, and then calcining the same to a temperature short of fusion and thereby rendering a portion of the calcium and phosphoric acid water soluble.

10. The process of manufacturing artificial fertilizer, consisting in mixing blast furnace slag, phosphatic material and soda ash in substantially the proportions of from 50 to 400 pounds of phosphatic material and soda ash to 1500 pounds of slag, and then calcining the same and thereby rendering a portion of the phosphoric acid water soluble.

11. The process of manufacturing artificial fertilizer, consisting in mixing blast furnace slag, phosphatic material, soda ash, and lime in a fine condition, in substantially the proportions of from 50 to 400 pounds of phosphatic material, soda ash, and lime to 1500 pounds of slag, and then calcining the same and thereby rendering a portion of the phosphoric acid water soluble.

12. The process of manufacturing artificial fertilizer, consisting in mixing limestone and blast furnace slag containing lime, all in a fine condition, and then calcining the same and thereby rendering said calcium compounds partly water soluble and partly citrate soluble.

In testimony whereof, I have hereunto set my hand.

JAMES H. CONNOR.

Witnesses:
  F. W. WINTER,
  WILLIAM B. WHARTON.